United States Patent
Onohara et al.

(10) Patent No.: US 9,802,177 B2
(45) Date of Patent: Oct. 31, 2017

(54) METAL ADSORPTION ACRYLIC FIBER, NON-WOVEN FABRIC, SHEET-LIKE PRODUCT, AND USES THEREOF AS METAL ADSORBENT

(71) Applicant: Mitsubishi Chemical Corporation, Tokyo (JP)

(72) Inventors: Yukio Onohara, Otake (JP); Tatsuhiko Inagaki, Otake (JP); Yasuyuki Fujii, Otake (JP); Masahiro Ootsubo, Otake (JP); Hideaki Kobayashi, Osaka (JP)

(73) Assignee: Mitsubishi Chemical Corporation, Tokyo (JP)

( * ) Notice: Subject to any disclaimer, the term of this patent is extended or adjusted under 35 U.S.C. 154(b) by 135 days.

(21) Appl. No.: 14/374,050

(22) PCT Filed: Jan. 25, 2013

(86) PCT No.: PCT/JP2013/051594
§ 371 (c)(1),
(2) Date: Jul. 23, 2014

(87) PCT Pub. No.: WO2013/111857
PCT Pub. Date: Aug. 1, 2013

(65) Prior Publication Data
US 2014/0364307 A1    Dec. 11, 2014

(30) Foreign Application Priority Data
Jan. 27, 2012 (JP) .................................. 2012-015194

(51) Int. Cl.
*G01N 33/20* (2006.01)
*B01J 20/26* (2006.01)
(Continued)

(52) U.S. Cl.
CPC ....... *B01J 20/261* (2013.01); *B01J 20/28011* (2013.01); *B01J 20/28023* (2013.01);
(Continued)

(58) Field of Classification Search
None
See application file for complete search history.

(56) References Cited

U.S. PATENT DOCUMENTS 3,929,946 A    12/1975 Orito et al.

FOREIGN PATENT DOCUMENTS

CN    101982580 A    3/2011
EP    0 294 135    12/1988
(Continued)

OTHER PUBLICATIONS

Bajaj et al. Influence of Spinning Dope Additives and Spin Bath Temperature on the Structure and Physical Properties of Acrylic Fibers, 1989, Textile Research Journal, vol. 59(10), pp. 601-608.*
(Continued)

*Primary Examiner* — Robert Xu
(74) *Attorney, Agent, or Firm* — Oblon, McClelland, Maier & Neustadt, L.L.P.

(57) ABSTRACT

A metal adsorption acrylic fiber wherein the strontium adsorption rate is 85% or more when the strontium adsorption rate is measured using the following measurement method. A strontium adsorption rate measurement method (strontium 0.1 ppm measurement method) involves immersing a metal adsorption acrylic fiber into an immersion fluid, collecting the immersion fluid as a testing solution 24 hours after beginning the immersion, analyzing the quantity of strontium in the testing solution, obtaining the concentration ($C_1$) (ppm) of strontium in the testing solution, creating a contrast solution, analyzing the quantity of strontium in the contrast solution as in the case with the testing solution, (Continued)

obtaining the concentration ($C_2$) (ppm) of strontium in the contrast solution, and calculating the strontium adsorption rate of the metal adsorption acrylic fiber by using the following equation: strontium adsorption rate (%)=$\{(C_2-C_1)/C_2\}\times100$.

18 Claims, 1 Drawing Sheet

(51) Int. Cl.
    *D01F 6/18* (2006.01)
    *D04H 1/43* (2012.01)
    *D01D 5/247* (2006.01)
    *B01J 20/28* (2006.01)
    *D01F 6/38* (2006.01)

(52) U.S. Cl.
    CPC ... *B01J 20/28033* (2013.01); *B01J 20/28038* (2013.01); *B01J 20/28059* (2013.01); *B01J 20/28061* (2013.01); *D01D 5/247* (2013.01); *D01F 6/18* (2013.01); *D01F 6/38* (2013.01); *D04H 1/43* (2013.01)

(56) References Cited

FOREIGN PATENT DOCUMENTS

| | | |
|---|---|---|
| FR | 1540997 A | 10/1968 |
| GB | 1 590 367 A | 6/1981 |
| JP | 48-10626 B1 | 4/1973 |
| JP | 63 309613 | 12/1988 |
| JP | 2 221404 | 9/1990 |
| JP | 4 277023 | 10/1992 |
| JP | 7-70231 A | 3/1995 |
| JP | 2003 342831 | 12/2003 |
| JP | 2007 126794 | 5/2007 |

OTHER PUBLICATIONS

Notice of Allowance dated Nov. 25, 2014 in Japanese Patent Application No. 2013-508309 (with English language translation).
International Search Report dated Apr. 23, 2013 in PCT/JP13/051594 Filed Jan. 25, 2013.
Extended European Search Report dated May 15, 2015 in Patent Application No. 13741255.7.

\* cited by examiner

METAL ADSORPTION ACRYLIC FIBER, NON-WOVEN FABRIC, SHEET-LIKE PRODUCT, AND USES THEREOF AS METAL ADSORBENT

TECHNICAL FIELD

The present invention relates to a metal adsorption acrylic fiber, and a non-woven fabric and a sheet-like product thereof as well as uses thereof as metal adsorbents.

The present application claims priority based on Japanese Patent Application No. 2012-015194 filed in Japan on Jan. 27, 2012, the content of which is incorporated herein by reference.

BACKGROUND ART

Conventionally, an acrylic fiber having a porous structure in which many voids are present has been is known (Patent Document 1), and a large number of technologies for creating porous structure therein also have been proposed. For example, technologies have been proposed in which a water soluble macromolecular component or an alkaline soluble component is added, and then removed after spinning (Patent Documents 2 and 3).

However, acrylic fibers having porous structure according to such technologies are all intended for improving hygroscopicity and water absorptivity, or for retaining an additive which provides a new function.

[Patent Document 1] Japanese Unexamined Patent Application, Publication No. S63-309613

[Patent Document 2] Japanese Unexamined Patent Application, Publication No. 2003-342831

[Patent Document 3] Japanese Unexamined Patent Application, Publication No. 2007-126794

DISCLOSURE OF THE INVENTION

Problems to be Solved by the Invention

An object of the present invention is to provide a metal adsorption acrylic fiber having a porous structure, and a non-woven fabric and a sheet-like product thereof as well as uses thereof as metal adsorbents.

Means for Solving the Problems

The present invention has the following aspects.

[1] A metal adsorption acrylic fiber, wherein a strontium adsorption rate is 85% or more when the strontium adsorption rate is measured by the following measurement method.

<A Method of Measuring a Strontium Adsorption Rate (a Strontium 0.1 ppm Measurement Method)>

To a 1000 mL capacity fluorine resin container, added is 5 g of the metal adsorption acrylic fiber which has been vacuum dried, and then 500 mL of an immersion liquid at 20° C. is added to the container to start immersion of the metal adsorption acrylic fiber, the immersion liquid comprising an aqueous solution of strontium carbonate with a concentration of 0.1 ppm. The temperature of the immersion liquid is maintained at 20° C., and the immersion liquid in the container is agitated 24 hours after the immersion started, and then the immersion liquid is collected as a test liquid. The test liquid is introduced into an inductively-coupled plasma mass spectrometer, and quantitative analysis is performed for strontium to obtain the concentration of strontium $C_1$ (ppm) in the test liquid. Apart from this, 500 mL of the immersion liquid at 20° C. alone is added to another container to give a reference liquid, and quantitative analysis is performed for strontium as in the test liquid to obtain the concentration of strontium $C_2$ (ppm) in the reference liquid.

The strontium adsorption rate of the metal adsorption acrylic fiber is computed by the following equation.

Strontium adsorption rate (%)=$\{(C_2-C_1)/C_2\}\times 100$

[2] The metal adsorption acrylic fiber according to [1], wherein a cesium adsorption rate is 70% or more when the cesium adsorption rate is measured by the following measurement method.

<A Method of Measuring a Cesium Adsorption Rate (a Cesium 0.1 ppm Measurement Method)>

To a 1000 mL capacity fluorine resin container, added is 5 g of the metal adsorption acrylic fiber which has been vacuum dried, and then 500 mL of an immersion liquid at 20° C. is added to the container to start immersion of the metal adsorption acrylic fiber, the immersion liquid comprising an aqueous solution of cesium chloride with a concentration of 0.1 ppm. The temperature of the immersion liquid is maintained at 20° C., and the immersion liquid in the container is agitated 24 hours after the immersion started, and then the immersion liquid is collected as a test liquid. The test liquid is introduced into an inductively-coupled plasma mass spectrometer, and quantitative analysis is performed for cesium to obtain the concentration of cesium $C_3$ (ppm) in the test liquid. Apart from this, 500 mL of the immersion liquid at 20° C. alone is added to another container to give a reference liquid, and quantitative analysis is performed for cesium as in the test liquid to obtain the concentration of cesium $C_4$ (ppm) in the reference liquid.

The cesium adsorption rate of the metal adsorption acrylic fiber is computed by the following equation.

Cesium adsorption rate (%)=$\{(C_4-C_3)/C_4\}\times 100$.

[3] The metal adsorption acrylic fiber according to [1] or [2], wherein a cerium adsorption rate is 85% or more when the cerium adsorption rate is measured by the following measurement method.

<A Method of Measuring a Cerium Adsorption Rate (a Cerium 0.1 ppm Measurement Method)>

To a 1000 mL capacity fluorine resin container, added is rylic fiber which has been vacuum dried, and then 500 mL 5 g of the metal adsorption ac of an immersion liquid at 20° C. is added to the container to start immersion of the metal adsorption acrylic fiber, the immersion liquid comprising an aqueous solution of cerium chloride (III) heptahydrate with a concentration of 0.1 ppm. The temperature of the immersion liquid is maintained at 20° C., and the immersion liquid in the container is agitated 24 hours after the immersion started, and then the immersion liquid is collected as a test liquid. The test liquid is introduced into an inductively-coupled plasma mass spectrometer, and quantitative analysis is performed for cerium to obtain the concentration of cerium $C_5$ (ppm) in the test liquid. Apart from this, 500 mL of the immersion liquid at 20° C. alone is added to another container to give a reference liquid, and quantitative analysis is performed for cerium as in the test liquid to obtain the concentration of cerium $C_6$ (ppm) in the reference liquid.

The cerium adsorption rate is computed by the following equation.

Cerium adsorption rate (%)=$\{(C_6-C_5)/C_6\}\times 100$.

[4] The metal adsorption acrylic fiber according to any one of [1] to [3], wherein the strontium adsorption rate is 70% or more when the strontium adsorption rate is measured by the following measurement method.

<A Method of Measuring a Strontium Adsorption Rate (a Strontium 1.0 ppm Measurement Method)>

The strontium adsorption rate is measured as in the method of measuring a strontium adsorption rate according to [1] except that an immersion liquid at 20° C. comprising an aqueous solution of strontium carbonate with a concentration of 1.0 ppm is used as the immersion liquid.

[5] The metal adsorption acrylic fiber according to any one of [1] to [4], wherein the cesium adsorption rate is 70% or more when the cesium adsorption rate is measured by the following measurement method.

<A Method of Measuring a Cesium Adsorption Rate (a Cesium 1.0 ppm Measurement Method)>

The cesium adsorption rate is measured as in the method of measuring a cesium adsorption rate according to [2] except that an immersion liquid at 20° C. comprising an aqueous solution of cesium chloride with a concentration of 1.0 ppm is used as the immersion liquid.

[6] The metal adsorption acrylic fiber according to any one of [1] to [5], wherein a BET specific surface area is 50 to 500 $m^2/g$.

[7] The metal adsorption acrylic fiber according to any one of [1] to [6], wherein a SAG value is 2 to 20.

[8] The metal adsorption acrylic fiber according to any one of [1] to [7], wherein the BET specific surface area is 80 to 200 $m^2/g$.

[9] The metal adsorption acrylic fiber according to any one of [1] to [8], which is obtainable by wet-spinning a spinning dope obtained by dissolving an acrylonitrile based polymer in a solvent into a solidifying liquid, and performing stretching and washing without dry densification treatment.

[10] A sheet-like product comprising the metal adsorption acrylic fiber according to any one of [1] to [9].

[11] A non-woven fabric comprising the metal adsorption acrylic fiber according to any one of [1] to [9].

[12] The non-woven fabric according to [11], having a weight per area of 50 to 1000 $g/m^2$ and a density of 0.05 to 0.5 $g/cm^3$.

[13] Use of the metal adsorption acrylic fiber according to [1] to [9] as a metal adsorbent.

[14] Use of the sheet-like product according to [10] as a metal adsorbent.

[15] Use of the non-woven fabric according to [11] or [12] as a metal adsorbent.

Effects of the Invention

The acrylic fiber having a porous structure according to the present invention, and a non-woven fabric and a sheet-like product thereof have excellent metal adsorption capacity, and are useful as metal adsorption fibers. As metals to be adsorbed, various metals may be applied. In particular, cesium, strontium and cerium, including their isotopes will be adsorbed as a form of an ion and a complex ion in a porous structure where voids inside a fiber and voids open to a surface of the fiber are present.

Further, uses of the acrylic fiber according to the present invention, and a non-woven fabric and a sheet-like product thereof as metal adsorption are effective for adsorbing, in particular, cesium, strontium and cerium.

PREFERRED MODE FOR CARRYING OUT THE INVENTION

In the following, embodiments of the present invention will be described in detail.

<<A Metal Adsorption Acrylic Fiber>>

The metal adsorption acrylic fiber according to a first aspect of the present invention comprises an acrylonitrile based polymer. The acrylonitrile based polymer comprises at least 85 mass %, preferably 87 to 100 mass % of a component unit derived from acrylonitrile. The polymer may be a copolymer of acrylonitrile and a copolymerizable vinyl monomer. Copolymerizable vinyl monomers include, for example, vinyl acetate, methyl acrylate, sodium methallylsulfonate and the like.

Methods of polymerizing these monomers include the aqueous suspension polymerization method, the solution polymerization method and the like.

The metal adsorption acrylic fiber according to the first aspect of the present invention can be manufactured by the following method. An acrylonitrile based polymer is dissolved in a solvent such as dimethylacetamide and dimethylformamide to prepare a spinning dope, and the spinning dope is usually wet-spun into a solidifying liquid to obtain a water-wet fiber. The term "water-wet" as used herein means a condition of an acrylic fiber containing 30 to 300 mass % of water relative to the mass of an acrylonitrile based polymer. Subsequently, the water-wet fiber is stretched and washed to obtain the metal adsorption acrylic fiber according to the present invention. This metal adsorption acrylic fiber is a water-wet fiber having a large number of voids filled with water. The above water-wet fiber will have a large number of voids inside the fiber without using a void-forming additive. Further, voids open to a surface of the fiber which are connected to the voids inside the fiber are present. The above water-wet fiber has a porous structure in which a BET specific surface area is 50 to 500 $m^2/g$ as measured by a measurement method described below, and the above porous structure shows metal adsorption capacity.

The term "porous structure" as used herein means a structure having a large number of voids.

Note that the phrase "wet-spinning into a solidifying liquid" refers to discharging a spinning dope through a spinneret having multiple pores into a solidifying liquid. The temperature of a solidifying liquid is preferably 10 to 60° C., and more preferably 15 to 50° C. A temperature of a solidifying liquid within the above range can allow a large number of fine voids to be created in a fiber.

Further, a stretching factor is preferably 1.5 to 7.0 times and more preferably 2.0 to 6.0 times. A stretching factor within the above range can allow a large number of fine voids to be created.

The metal adsorption acrylic fiber according to the first aspect of the present invention is preferably a metal adsorption acrylic fiber obtainable by wet-spinning a spinning dope obtained by dissolving an acrylonitrile based polymer in a solvent into a solidifying liquid, and performing stretching and washing without dry densification treatment.

The term "dry densification treatment" as used herein refers to heating a fiber under tension at a temperature of 100 to 200° C. and performing drying while crushing fine pores of the fiber.

According to the present invention, an acrylic fiber having a porous structure in which a BET specific surface area is 50 to 500 m²/g is preferably a fiber having a porous structure in an undried condition (that is, a water-wet fiber), but may be a fiber in a dry condition as long as the porous structure is maintained. The term "dry condition" as used herein means a condition of an acrylic fiber containing 0 to 5 mass % of water relative to the mass of an acrylonitrile based polymer. A fiber with a porous structure having a BET specific surface area of 50 to 500 m²/g in a dry condition can be obtained, for example, by adding a water soluble macromolecular component such as glycerol and an alkaline soluble component such as a block polyether ester to an acrylonitrile based polymer for spinning; and then removing the water soluble macromolecular component such as glycerol and the alkaline soluble component such as a block polyether ester from the acrylonitrile based polymer.

Further, in the present invention, there is no particular limitation for the porous structure, in particular for the size of individual voids and the number of voids because the acrylic fiber according to the present invention is intended for metal adsorption. However, a BET specific surface area is preferably in the range of 50 to 500 m²/g. An acrylic fiber having the above BET specific surface area may be obtained by adjusting a composition of acrylonitrile copolymers, a temperature of a solidifying liquid, a stretching factor and the like to appropriate numerical ranges used in a common wet-spinning method without performing dry densification treatment.

In a case where a BET specific surface area is 50 m²/g or more, more metal can be adsorbed and 80 m²/g is more preferred. Further, in a case where a BET specific surface area is 500 m²/g or less, handling and safety properties upon collection and treatment after adsorption are excellent because an amount of metal adsorption is adequate. Therefore, it is preferred and 200 m²/g or less is more preferred. More specifically, 50 to 500 m²/g is preferred, and 80 to 200 m²/g is more preferred, and 100 to 160 m²/g is even more preferred.

Methods of measuring a BET specific surface area include the following.

<A Method of Measuring a BET Specific Surface Area>

A metal adsorption acrylic fiber in a wet condition is freeze-dried, of which about 0.2 g is collected and subjected to vacuum drying for 12 hours at 20° C., and then weighed. Subsequently, a specific surface area is measured by the BET method with a specific surface area and pore distribution measurement device (Micromeritics Instrument Corporation, Tristar 3000). An amount of adsorbed nitrogen gas at the boiling point (−195.8° C.) of liquid nitrogen is measured at a relative pressure ranging from 0.05 to 0.30 to create an adsorption isotherm for the sample, and a specific surface area (m²/g) is measured by the BET method.

Note that when measuring a BET specific surface area of a metal adsorption acrylic fiber in a dry condition, freeze-drying is not performed, but vacuum drying is performed for 12 hours at 20° C., and then measurements are performed as in the method of measuring a BET specific surface area of a metal adsorption acrylic fiber in a wet condition.

The term "SAG value" as used herein represents an amount of acidic terminal groups (strongly acidic groups) in a polymer. Specifically, "acidic terminal groups (strongly acidic groups)" include a dyesite such as sodium methallylsulfonate, a —$SO_3$ group from a polymerization initiator and the like.

<A Method of Measuring a SAG Value>

X g of a metal adsorption acrylic fiber is dissolved in 50 ml of dimethylformamide, and passed through an ion exchange resin to give a free acid. Then neutralization titration is performed with a 0.01 N potassium hydroxide/methanol solution until pH 7 is reached using an automatic titrator type GT-100 (Mitsubishi Chemical Corporation). A titrated amount of the 0.01 N potassium hydroxide/methanol solution at that time is denoted as A ml.

Further, 50 ml of dimethylformamide which does not contain the sample is taken as a blank test to perform operation and titration in a similar fashion. A titrated amount of the 0.01 N potassium hydroxide/methanol solution at that time is denoted as B ml. From these, a SAG value can be calculated by the following equation.

$$\text{SAG value (equivalent g/g)} = (A-B)/X \times f \times 10^{-5}$$

wherein f=a titer of the 0.01 N potassium hydroxide/methanol solution

In the present invention, a SAG value of 2 to 20 is preferred. If a SAG value is 2 or more, more metal can be adsorbed, and 2.5 or more is more preferred. Further, if a SAG value is 20 or less, handling and safety properties upon collection and treatment after adsorption are excellent because an amount of metal adsorption is adequate. Therefore, it is preferred, and 16 or less is more preferred, and 10 or less is even more preferred.

The metal adsorption acrylic fiber having a porous structure according to the present invention shows excellent metal adsorption capacity, and is useful as a metal adsorption fiber. As metals to be adsorbed, various metals may be applied such as aluminum, strontium, cesium, cerium, magnesium and sodium. In particular, cesium, strontium and cerium, including their isotopes will be captured and adsorbed as a low volume substance in a form of an ion and a complex ion in voids inside a fiber and voids open to a surface of the fiber. The term "low volume substance" as used herein means those having a particle size smaller than the pore diameter of a void. The mechanism of adsorption is not clearly understood. Nonetheless, it is assumedly resulted from ion exchange with sodium sulfonate from a polymerization initiator contained in an acrylic fiber or contained as a copolymerization component (that is, a copolymer having a —$SO_3$—$Na^+$ group). Further, a physical adsorption effect due to the presence of a large number of voids is also plausible.

As used herein, strontium, cesium and cerium may be denoted as Sr, Cs and Ce, respectively.

For the metal adsorption acrylic fiber according to the present invention, methods of determining metal adsorption capacity (an adsorption rate) specifically include the following methods.

<A Method of Measuring a Strontium Adsorption Rate (a Strontium 0.1 ppm Measurement Method)>

To a 1000 mL capacity fluorine resin container (a copolymer of tetrafluoroethylene and perfluoro alkyl vinyl ether), added is 5 g of the metal adsorption acrylic fiber which has been vacuum dried, and then 500 mL of an immersion liquid at 20° C. is added to the container to start immersion of the metal adsorption acrylic fiber, the immersion liquid comprising an aqueous solution of strontium carbonate with a concentration of 0.1 ppm. The temperature of the immersion liquid is maintained at 20° C., and the immersion liquid in the container is agitated 24 hours after the immersion started, and then the immersion liquid is collected as a test liquid. The test liquid is introduced into an inductively-coupled plasma mass spectrometer (Agilent Technologies, Inc., Agilent 7500ce), and quantitative analysis is performed for strontium to obtain the concentration of strontium $C_1$ (ppm) in the test liquid. Apart from this, 500 mL of the immersion liquid at 20° C. alone is added to another container to give a reference liquid, and quantitative analysis is performed for strontium as in the test liquid to obtain the concentration of strontium $C_2$ (ppm) in the reference liquid.

The strontium adsorption rate of the metal adsorption acrylic fiber is computed by the following equation.

Strontium adsorption rate (%)=$\{(C_2-C_1)/C_2\}\times 100$

<A Method of Measuring a Cesium Adsorption Rate (a Cesium 0.1 ppm Measurement Method)>

To a 1000 mL capacity fluorine resin container (a copolymer of tetrafluoroethylene and perfluoro alkyl vinyl ether), added is 5 g of the metal adsorption acrylic fiber which has been vacuum dried, and then 500 mL of an immersion liquid at 20° C. is added to the container to start immersion of the metal adsorption acrylic fiber, the immersion liquid comprising an aqueous solution of cesium chloride with a concentration of 0.1 ppm. The temperature of the immersion liquid is maintained at 20° C., and the immersion liquid in the container is agitated 24 hours after the immersion started, and then the immersion liquid is collected as a test liquid. The test liquid is introduced into an inductively-coupled plasma mass spectrometer (Agilent Technologies, Inc., Agilent 7500ce), and quantitative analysis is performed for cesium to obtain the concentration of cesium $C_3$ (ppm) in the test liquid. Apart from this, 500 mL of the immersion liquid at 20° C. alone is added to another container to give a reference liquid, and quantitative analysis is performed for cesium as in the test liquid to obtain the concentration of cesium $C_4$ (ppm) in the reference liquid.

The cesium adsorption rate of the metal adsorption acrylic fiber is computed by the following equation.

Cesium adsorption rate (%)=$\{(C_4-C_3)/C_4\}\times 100$

<A Method of Measuring a Cerium Adsorption Rate (a Cerium 0.1 ppm Measurement Method)>

To a 1000 mL capacity fluorine resin container (a copolymer of tetrafluoroethylene and perfluoro alkyl vinyl ether), added is 5 g of the metal adsorption acrylic fiber which has been vacuum dried, and then 500 mL of an immersion liquid at 20° C. is added to the container to start immersion of the metal adsorption acrylic fiber, the immersion liquid comprising an aqueous solution of cerium chloride (III) heptahydrate with a concentration of 0.1 ppm. The temperature of the immersion liquid is maintained at 20° C., and the immersion liquid in the container is agitated 24 hours after the immersion started, and then the immersion liquid is collected as a test liquid. The test liquid is introduced into an inductively-coupled plasma mass spectrometer (Agilent Technologies, Inc., Agilent 7500ce), and quantitative analysis is performed for cerium to obtain the concentration of cerium $C_5$ (ppm) in the test liquid. Apart from this, 500 mL of the immersion liquid at 20° C. alone is added to another container to give a reference liquid, and quantitative analysis is performed for cerium as in the test liquid to obtain the concentration of cerium $C_6$ (ppm) in the reference liquid.

A cerium adsorption rate is computed by the following equation.

Cerium adsorption rate (%)=$\{(C_6-C_5)/C_6\}\times 100$

<A Method of Measuring a Strontium Adsorption Rate (a Strontium 1.0 ppm Measurement Method)>

To a 1000 mL capacity fluorine resin container (a copolymer of tetrafluoroethylene and perfluoro alkyl vinyl ether), added is 5 g of the metal adsorption acrylic fiber which has been vacuum dried, and then 500 mL of an immersion liquid at 20° C. is added to the container to start immersion of the metal adsorption acrylic fiber, the immersion liquid comprising an aqueous solution of strontium carbonate with a concentration of 1.0 ppm. The temperature of the immersion liquid is maintained at 20° C., and the immersion liquid in the container is agitated 24 hours after the immersion started, and then the immersion liquid is collected as a test liquid. The test liquid is introduced into an inductively-coupled plasma mass spectrometer (Agilent Technologies, Inc., Agilent 7500ce), and quantitative analysis is performed for strontium to obtain the concentration of strontium $C_1$ (ppm) in the test liquid. Apart from this, 500 mL of the immersion liquid at 20° C. alone is added to another container to give a reference liquid, and quantitative analysis is performed for strontium as in the test liquid to obtain the concentration of strontium $C_2$ (ppm) in the reference liquid.

The strontium adsorption rate of the metal adsorption acrylic fiber is computed by the following equation.

Strontium adsorption rate (%)=$\{(C_2-C_1)/C_2\}\times 100$

<A Method of Measuring a Cesium Adsorption Rate (a Cesium 1.0 ppm Measurement Method)>

To a 1000 mL capacity fluorine resin container (a copolymer of tetrafluoroethylene and perfluoro alkyl vinyl ether), added is 5 g of the metal adsorption acrylic fiber which has been vacuum dried, and then 500 mL of an immersion liquid at 20° C. is added to the container to start immersion of the metal adsorption acrylic fiber, the immersion liquid comprising an aqueous solution of cesium chloride with a concentration of 1.0 ppm. The temperature of the immersion liquid is maintained at 20° C., and the immersion liquid in the container is agitated 24 hours after the immersion started, and then the immersion liquid is collected as a test liquid. The test liquid is introduced into an inductively-coupled plasma mass spectrometer (Agilent Technologies, Inc., Agilent 7500ce), and quantitative analysis is performed for cesium to obtain the concentration of cesium $C_3$ (ppm) in the test liquid. Apart from this, 500 mL of the immersion liquid at 20° C. alone is added to another container to give a reference liquid, and quantitative analysis is performed for cesium as in the test liquid to obtain the concentration of cesium $C_4$ (ppm) in the reference liquid.

A cesium adsorption rate of the metal adsorption acrylic fiber is computed by the following equation.

Cesium adsorption rate (%)=$\{(C_4-C_3)/C_4\}\times 100$

<A Method of Measuring a Cerium Adsorption Rate (a Cerium 1.0 ppm Measurement Method)>

To a 1000 mL capacity fluorine resin container (a copolymer of tetrafluoroethylene and perfluoro alkyl vinyl ether), added is 5 g of the metal adsorption acrylic fiber which has been vacuum dried, and then 500 mL of an immersion liquid at 20° C. is added to the container to start immersion of the metal adsorption acrylic fiber, the immersion liquid comprising an aqueous solution of cerium chloride (III) heptahydrate with a concentration of 1.0 ppm. The temperature of the immersion liquid is maintained at 20° C., and the immersion liquid in the container is agitated 24 hours after the immersion started, and then the immersion liquid is collected as a test liquid. The test liquid is introduced into an inductively-coupled plasma mass spectrometer (Agilent Technologies, Inc., Agilent 7500ce), and quantitative analysis is performed for cesium to obtain the concentration of cerium $C_5$ (ppm) in the test liquid. Apart from this, 500 mL of the immersion liquid at 20° C. alone is added to another container to give a reference liquid, and quantitative analysis is performed for cerium as in the test liquid to obtain the concentration of cerium $C_6$ (ppm) in the reference liquid.

The cerium adsorption rate of the metal adsorption acrylic fiber is computed by the following equation.

Cerium adsorption rate (%)={$(C_6-C_5)/C_6$}×100

The strontium adsorption rate of the metal adsorption acrylic fiber is preferably 85 to 100%, more preferably 90 to 100% as measured by the above "strontium 0.1 ppm measurement method."

Those within the above numerical range can allow strontium to be efficiently adsorbed. The cesium adsorption rate of the metal adsorption acrylic fiber is preferably 70 to 100%, more preferably 85 to 100% as measured by the above "cesium 0.1 ppm measurement method."

Those within the above numerical range can allow cesium to be efficiently adsorbed. The cerium adsorption rate of the metal adsorption acrylic fiber is preferably 85 to 100%, more preferably 90 to 100% as measured by the above "cerium 0.1 ppm measurement method."

Those within the above numerical range can allow cerium to be efficiently adsorbed. The strontium adsorption rate of the metal adsorption acrylic fiber is preferably 70 to 100%, more preferably 85 to 100% as measured by the above "strontium 1.0 ppm measurement method."

Those within the above numerical range can allow cerium to be efficiently adsorbed. The cesium adsorption rate of the metal adsorption acrylic fiber is preferably 70 to 100%, more preferably 85 to 100% as measured by the above "cesium 1.0 ppm measurement method."

Those within the above numerical range can allow cesium to be efficiently adsorbed. The cerium adsorption rate of the metal adsorption acrylic fiber is preferably 70 to 100%, more preferably 85 to 100% as measured by the above "cerium 1.0 ppm measurement method."

Those within the above numerical range can allow cerium to be efficiently adsorbed.

Note that in the above measurement methods, the term "metal adsorption acrylic fiber which has been vacuum dried" means an acrylic fiber which is dried to contain 0 to 5 mass % of water relative to the mass of an acrylonitrile based polymer by vacuum drying the metal adsorption acrylic fiber.

<<A Non-Woven Fabric and a Sheet-Like Product>>

A non-woven fabric according to a second aspect of the present invention comprises the metal adsorption acrylic fiber according to the first aspect of the present invention.

A sheet-like product according to a third aspect of the present invention comprises the metal adsorption acrylic fiber according to the first aspect of the present invention.

The term "non-woven fabric" refers to a fabric sheet, web or pad in which fibers are oriented in one direction or random directions, and bonded by entanglement and/or fusion and/or adhesion between them. The term "sheet-like product" refers to paper, textile, film, felt, leather and the like.

A non-woven fabric and a sheet-like product may be in a form where they are laminated in many layers or in a form where those with different compositions are combined.

The non-woven fabric and the sheet-like product according to the present invention preferably comprise the metal adsorption acrylic fiber according to the present invention by 100% as a constituent fiber thereof because good metal adsorption capability can be obtained. However, other fibers may also be mixed in order to maintain other capabilities such as strength. There is no particular limitation for other fibers, but they include, for example, acrylic fibers not for metal adsorption, polyester fibers, nylon fibers, rayon, wool, cotton and the like. A mixing ratio of the acrylic fiber and other fibers should be in a range where the metal adsorption capability is not decreased, and they are preferably mixed at 100:0 to 50:50 by mass ratio.

Further, a non-woven fabric and a sheet-like product having a weight per area of 50 to 1000 $g/m^2$, more preferably 70 to 800 $g/m^2$ are preferred. The term "weight per area" as used herein means the number of grams per square meter. A weight per area within the above range can allow metal to be efficiently adsorbed.

Further, a non-woven fabric having a density of 0.05 to 0.5 $g/cm^3$, more preferably 0.1 to 0.4 $g/m^2$. A density within the above range can allow metal to be efficiently adsorbed.

<<Uses of a Metal Adsorption Acrylic Fiber, a Non-Woven Fabric and a Sheet-Like Product as Metal Adsorbents>>

A fourth aspect of the present invention is use of the metal adsorption acrylic fiber according to the first aspect of the present invention as a metal adsorbent.

The fifth aspect of the present invention is use of the non-woven fabric according to the second aspect of the present invention as a metal adsorbent.

The sixth aspect of the present invention is use of the sheet-like product according to the third aspect of the present invention as a metal adsorbent.

Conventionally, zeolite is known as a material which adsorbs metals such as strontium, cesium and cerium. Zeolite shows excellent metal adsorption capability. However it needs to be landfilled for disposal because it is of ceramics. In contrast, the metal adsorption acrylic fiber, the non-woven fabric and the sheet-like product according to the present invention can be permanently disposed in an efficient way such as by landfill because their volume can be reduced by incineration or solvent treatment after metal adsorption.

Methods of adsorbing a metal to be adsorbed by the acrylic fiber according to the present invention include a method in which a metal is adsorbed by an acrylic fiber by immersing the acrylic fiber in a liquid containing a metal to be adsorbed, thereby bringing the acrylic fiber into contact with the metal. Specifically, they include a method in which the metal adsorption acrylic fiber according to the present invention in a form of a tow having a length of tens of centimeters is immersed in a liquid containing a metal, or a method in which a metal is adsorbed by a metal adsorption acrylic fiber by dispersing the metal adsorption acrylic fiber in a form of a short fiber having a length of about several millimeters to several centimeters, with agitation if desired, to improve the contact of the metal adsorption acrylic fiber with the metal.

Methods of adsorbing a metal to be adsorbed by the non-woven fabric according to the present invention include a method in which a metal is adsorbed by a non-woven fabric by immersing the non-woven fabric in a liquid containing a metal to be adsorbed, thereby bringing the non-woven fabric into contact with the metal.

Methods of adsorbing a metal to be adsorbed by the sheet-like product according to the present invention include a method in which a metal is adsorbed by a sheet-like product by immersing the sheet-like product in a liquid containing a metal to be adsorbed, thereby bringing the sheet-like product into contact with the metal.

When a metal adsorption acrylic fiber, a non-woven fabric or a sheet-like product is immersed in a liquid containing a metal to be adsorbed, the metal adsorption acrylic fiber, the non-woven fabric or the sheet-like product may be immobilized, and the liquid containing a metal to be adsorbed may be allowed to flow. Alternatively, a metal adsorption acrylic fiber, a non-woven fabric or a sheet-like product may be allowed to flow without flow of a liquid containing a metal to be adsorbed. Alternatively, a liquid containing a metal to be adsorbed, and a metal adsorption acrylic fiber, a non-woven fabric or a sheet-like product may be agitated to allow the liquid containing a metal to be adsorbed, and the metal adsorption acrylic fiber, the non-woven fabric or the sheet-like product to flow all together.

Further, other methods of allowing a metal to be adsorbed by the non-woven fabric or the sheet-like product according to the present invention include a method in which a non-woven fabric or a sheet-like product is brought into contact with a liquid containing a metal to be adsorbed using the non-woven fabric or the sheet-like product as a wiping cloth to wiped out the liquid containing a metal to be adsorbed.

EXAMPLES

In the following, the present invention will be described in detail with reference to Examples. Note that measurement items in Examples were in accordance with the following methods.

<A Method of Measuring a BET Specific Surface Area>

A metal adsorption acrylic fiber in a wet condition was freeze-dried, of which about 0.2 g was collected and subjected to vacuum drying for 12 hours at an ambient temperature of 20° C., and then weighed. Subsequently, a specific surface area was measured by the BET method with a specific surface area and pore distribution measurement device (Micromeritics Instrument Corporation, Tristar 3000). An amount of adsorbed nitrogen gas at the boiling point (−195.8° C.) of liquid nitrogen was measured at a relative pressure ranging from 0.05 to 0.30 to create an adsorption isotherm for the sample, and a specific surface area ($m^2/g$) was measured by the BET method.

<A SAG Value>

X g of a metal adsorption acrylic fiber was dissolved in 50 ml of dimethylformamide, and passed through an ion exchange resin to give a free acid. Then neutralization titration was performed with a 0.01 N potassium hydroxide/methanol solution until pH 7 was reached using an automatic titrator type GT-100 (Mitsubishi Chemical Corporation). A titrated amount of the 0.01 N potassium hydroxide/methanol solution at that time was denoted as A ml.

Further, 50 ml of dimethylformamide which does not contain the sample was taken as a blank test to perform operation and titration in a similar fashion. A titrated amount of the 0.01 N potassium hydroxide/methanol solution at that time was denoted as B ml. From these, a SAG value can be calculated by the following equation.

$$\text{SAG value (equivalent g/g)} = (A-B)/X \times f \times 10^{-5}$$

wherein f=a titer of the 0.01 N potassium hydroxide/methanol solution

<A Method of Measuring a Sr Adsorption Rate (a Strontium 0.1 ppm Measurement Method)>

To a 1000 mL capacity fluorine resin container (a copolymer of tetrafluoroethylene and perfluoro alkyl vinyl ether), added was 5 g of a sample which has been vacuum dried at an ambient temperature of 20° C., and then 500 mL of an immersion liquid (an aqueous solution of strontium carbonate with a concentration of 0.1 ppm) was added to the container to immerse the sample at a room temperature. The content in the container was agitated 24 hours after the immersion started, and then the immersion liquid was collected as a test liquid. The test liquid was then introduced into an inductively-coupled plasma mass spectrometer (Agilent Technologies, Inc., Agilent 7500ce), and quantitative analysis was performed for strontium to obtain the concentration of strontium $C_2$ in the test liquid. Apart from this, 500 mL of the immersion liquid alone was added to a similar container to give a reference liquid, and quantitative analysis was performed for strontium as in the test liquid to obtain the concentration of strontium $C_1$ in the reference liquid.

The Cs adsorption rate was computed by the following equation.

$$\text{Sr adsorption rate (\%)} = \{(C_2-C_1)/C_2\} \times 100$$

<A Method of Measuring a Cs Adsorption Rate (a Cesium 0.1 ppm Measurement Method)>

A Cs adsorption rate was computed in a similar fashion except that cesium chloride was substituted for strontium carbonate in the method of measuring a Sr adsorption rate (the strontium 0.1 ppm measurement method).

<A Method of Measuring a Ce Adsorption Rate (a Cerium 0.1 ppm Measurement Method)>

A Ce adsorption rate was computed in a similar fashion except that cerium chloride (III) heptahydrate was substituted for strontium carbonate in the method of measuring a Sr adsorption rate (the strontium 0.1 ppm measurement method).

<A Method of Measuring a Sr Adsorption Rate (a Strontium 1.0 ppm Measurement Method)>

A Sr adsorption rate was computed in a similar fashion except that the concentration of strontium carbonate of 1.0 ppm was substituted for the concentration of strontium carbonate of 0.1 ppm in the method of measuring a Sr adsorption rate (the strontium 0.1 ppm measurement method).

<A Method of Measuring a Cs Adsorption Rate (a Cesium 1.0 ppm Measurement Method)>

A Cs adsorption rate was computed in a similar fashion except that the concentration of cesium chloride (III) heptahydrate of 1.0 ppm was substituted for the concentration of strontium of 1.0 ppm in the method of measuring a Sr adsorption rate (the strontium 1.0 ppm measurement method).

<A Method of Measuring a Ce Adsorption Rate (a Cerium 1.0 ppm Measurement Method)>

A Ce adsorption rate was computed in a similar fashion except that cerium chloride (III) heptahydrate was substituted for strontium carbonate in the method of measuring a Sr adsorption rate (the strontium 1.0 ppm measurement method).

Example 1

Figure 1:
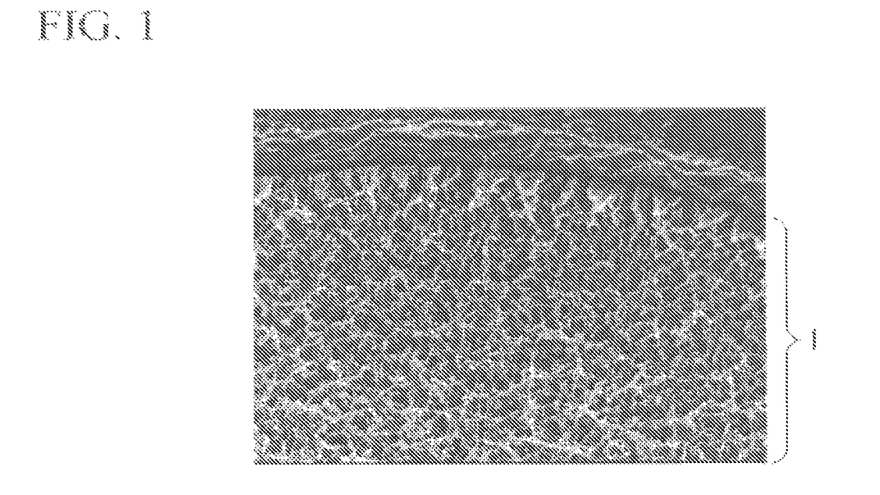
FIG. 1 shows a scanning electron microscope photograph of one example of the metal adsorption acrylic fiber according to the present invention in the direction perpendicular to the fiber axis (a magnification of 10000).
Figure 2:
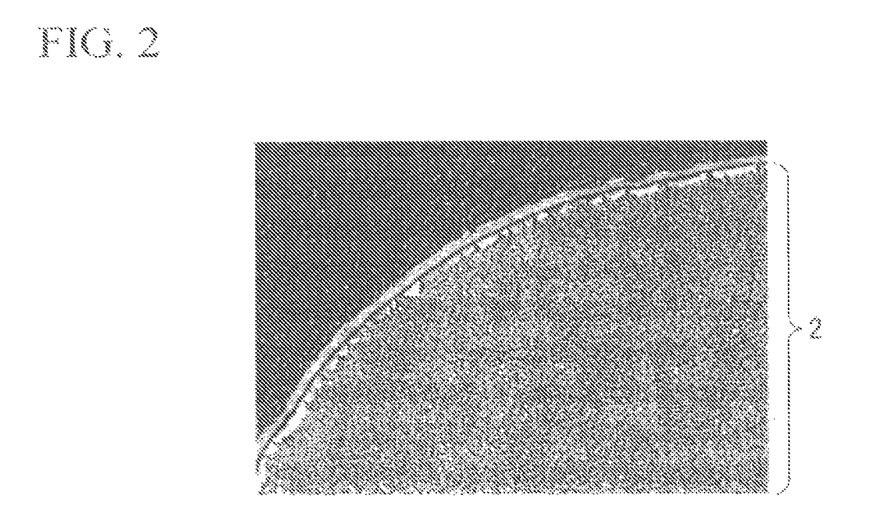
FIG. 2 shows a scanning electron microscope photograph of another example of the metal adsorption acrylic fiber according to the present invention in the direction perpendicular to the fiber axis (a magnification of 10000).

An acrylonitrile based copolymer comprising 93 mass % of acrylonitrile obtained by the aqueous suspension polymerization method (hereinafter may be called as "AN") and 7 mass % of vinyl acetate (hereinafter may be called as "AV") was dissolved in dimethylacetamide to prepare a spinning dope having a polymer concentration of 25 mass %. The spinning dope was wet spun into a solidifying liquid comprising 55 mass % aqueous dimethylacetamide at a temperature of 30° C. using a spinneret having a circular pore shape, and stretched by a stretching factor of 5.0 times while washing and removing the solvent in boiling water to obtain a water wet acrylic fiber tow in an undried condition with a single fiber fineness of 3.3 dtex. The resulting acrylic fiber was vacuum dried, and a BET specific surface area and an adsorption rate of each metal were measured by the above measurement methods. The resulting acrylic fiber showed a porous structure having a BET specific surface area of 98 m$^2$/g, and showed a Cs adsorption rate of 83%, a Sr adsorption rate of 100% and a Ce adsorption rate of 100% as measured by the 0.1 ppm measurement method for each metal, demonstrating very good metal adsorption capability. The results are shown in Table 1, and a photograph of a fiber cross-section of the resulting acrylic fiber is shown in FIG. 1.

Example 2

A water-wet acrylic fiber tow was obtained as in Example 1 except that the temperature of the solidifying liquid was changed to 50° C., and the stretching factor was changed to 3.0 in Example 1. Results such as metal adsorption capability are shown in table 1.

Example 3

An acrylonitrile based copolymer comprising 94.5 mass % of AN obtained by the aqueous suspension polymerization method, 5.0 mass % of AV and 0.5 mass % of sodium methallylsulfonate (hereinafter may be call as "MS") was dissolved in dimethylacetamide to prepare a spinning dope having a polymer concentration of 25 mass %. The spinning dope was wet spun into a solidifying liquid comprising 55 mass % aqueous dimethylacetamide at a temperature of 30° C. using a spinneret having a circular pore shape, and stretched by a stretching factor of 5.0 times while washing and removing the solvent in boiling water to obtain a water wet acrylic fiber in an undried condition with a single fiber fineness of 3.3 dtex. Results such as metal adsorption capability are shown in Table 1.

Example 4

A water-wet acrylic fiber tow in an undried condition was obtained as in Example 3 except that the temperature of the solidifying liquid was changed to 50° C., and the stretching factor was changed to 3.0. Results such as metal adsorption capability are shown in table 1.

Comparative Example 1

An acrylonitrile based copolymer comprising 93 mass % of AN obtained by the aqueous suspension polymerization method and 7 mass % of AV was dissolved in dimethylacetamide to prepare a spinning dope having a polymer concentration of 25 mass %. The spinning dope was wet spun into a solidifying liquid comprising 55 mass % aqueous dimethylacetamide at a temperature of 30° C. using a spinneret having a circular pore shape, and stretched by a stretching factor of 5.0 times while washing and removing the solvent in boiling water, and then subjected to a drying step by hot rolling at 150° C. under tension to perform dry compaction treatment for crashing existing voids. Then an acrylic fiber tow in a dry condition with a single fiber fineness of 3.3 dtex was obtained. The resulting acrylic fiber showed a non-porous structure having a BET specific surface area of 1 m$^2$/g or less, and showed a Cs adsorption rate of 6%, a Sr adsorption rate of 80% and a Ce adsorption rate of 80% as measured by the 0.1 ppm measurement method for each metal, demonstrating poor metal adsorption capability. Results such as metal adsorption capability are shown in table 1.

Comparative Example 2

An acrylonitrile based copolymer comprising 94.5 mass % of AN obtained by the aqueous suspension polymerization method, 7 mass % of AV and 0.5 mass % of MS was dissolved in dimethylacetamide to prepare a spinning dope having a polymer concentration of 25 mass %. The spinning dope was wet spun into a solidifying liquid comprising 55 mass % aqueous dimethylacetamide at a temperature of 30° C. using a spinneret having a circular pore shape, and stretched by a stretching factor of 5.0 times while washing and removing the solvent in boiling water, and then subjected to a drying step by hot rolling at 150° C. under tension to perform dry compaction treatment for crashing existing voids. Then an acrylic fiber tow in a dry condition with a single fiber fineness of 3.3 dtex was obtained. The resulting acrylic fiber showed a non-porous structure having a BET specific surface area of 1 m$^2$/g or less, and showed a Cs adsorption rate of 8%, a Sr adsorption rate of 65% and a Ce adsorption rate of 72% as measured by the 0.1 ppm measurement method for each metal, demonstrating poor metal adsorption capability. Results such as metal adsorption capability are shown in table 1.

Example 5

Using the acrylic fiber from Example 1, measurements were performed in accordance with the above adsorption rate measurement methods with a concentration of 1.0 ppm in the aqueous solution for each of Cs, Sr and Ce. Results such as metal adsorption performance are shown in table 1.

Example 6

Using the acrylic fiber from Example 3, an adsorption rate of each metal was measured in accordance with the above adsorption rate measurement method with a concentration of 1.0 ppm in the aqueous solution for each of Cs, Sr and Ce. Results such as metal adsorption performance are shown in table 1.

Conditions and measurement results in manufacture of acrylic fibers in Examples and Comparative Examples described above are shown together in Table 1.

The term "measured Sr concentration (ppm)" in the table refers to the initial concentration of Sr in the aqueous solution which is an immersion liquid.

The term "measured Cs concentration (ppm)" in the table refers to the initial concentration of Cs in the aqueous solution which is an immersion liquid.

The term "measured Ce concentration (ppm)" in the table refers to the initial concentration of Ce in the aqueous solution which is an immersion liquid.

TABLE 1

| | AN/AV/MS Composition (mass %) | Solidifying bath temperature (° C.) | Stretching factor (times) | Drying conditions | Specific surface area (g/m²) | SAG value | Measured Cs concentration (ppm) | Cs adsorption rate (%) | Measured Sr concentration (ppm) | Sr adsorption rate (%) | Measured Ce concentration (ppm) | Ce adsorption rate (%) |
|---|---|---|---|---|---|---|---|---|---|---|---|---|
| Example1 | 93/7/0 | 30 | 5 | Vacuum dry | 98 | 3.5 | 0.1 | 83 | 0.1 | 100 | 0.1 | 100 |
| Example2 | 93/7/0 | 50 | 3 | Vacuum dry | 84 | 3.5 | 0.1 | 83 | 0.1 | 100 | 0.1 | 100 |
| Example3 | 94.5/5.0/0.5 | 30 | 5 | Vacuum dry | 154 | 7.1 | 0.1 | 90 | 0.1 | 100 | 0.1 | 100 |
| Example4 | 94.5/5.0/0.5 | 50 | 3 | Vacuum dry | 139 | 7.1 | 0.1 | 90 | 0.1 | 100 | 0.1 | 100 |
| Comparative Example1 | 93/7/0 | 30 | 5 | Hot rolling dry | No more than 1 (one) | 3.5 | 0.1 | 6 | 0.1 | 80 | 0.1 | 80 |
| Comparative Example2 | 94.5/5.0/0.5 | 30 | 5 | Hot rolling dry | No more than 1 (one) | 7.1 | 0.1 | 8 | 0.1 | 65 | 0.1 | 72 |
| Example5 | 93/7/0 | 30 | 5 | Vacuum dry | 98 | 3.5 | 1.0 | 93 | 1.0 | 100 | 1.0 | 100 |
| Example6 | 94.5/5.0/0.5 | 30 | 5 | Vacuum dry | 154 | 7.1 | 1.0 | 90 | 1 0 | 100 | 1.0 | 100 |

Example 7

With a pulper, 70 mass % of a short-cut fiber obtained by cutting the acrylic fiber from Example 1 into a length of 6 mm was mixed with 30 mass % of a rayon fiber with a cut length of 6 mm and a fineness of 1.7 dtex. Subsequently, paper-making into a web-like form with a weight per area of 65 g per square meter and a density of 0.1 g per cubic centimeter was performed, and water flow entanglement was then performed with water jet. After dried for 1 minute by hot air drying, a sheet-like product was obtained.

The resulting non-woven fabric showed good metal adsorption performance as high as 90% as a result of measuring a Sr adsorption rate in accordance with the above "strontium 0.1 ppm measurement method."

Example 8

A non-woven fabric obtained by a similar approach as in Example 7 showed good metal adsorption performance as high as 79% as a result of measuring a Sr adsorption rate in accordance with the above "strontium 1.0 ppm measurement method."

Comparative Example 3

Using a non-woven-fabric "Product Name: BORANSHIRU" from Toyobo Co., Ltd. which has metal adsorption capability, a Sr adsorption rate was measured in accordance with the above "strontium 0.1 ppm measurement method." Results showed poor metal adsorption capability as low as 66%.

INDUSTRIAL APPLICABILITY

The acrylic fiber having a porous structure according to the present invention has excellent metal adsorption capacity, and is useful as a metal adsorption material.

EXPLANATION OF REFERENCE NUMERALS

1 A scanning electron microscope photograph of a fiber cross-section of the acrylic fiber from Example 1

2 A scanning electron microscope photograph of a fiber cross-section of the acrylic fiber from Example 3

The invention claimed is:

1. A metal adsorption acrylic fiber, wherein:
   said fiber consists of an acrylonitrile-based copolymer comprising at least 85 mass % of a component unit derived from acrylonitrile and component units derived from vinyl acetate and sodium methallylsulfonate and 30-300 mass % of water relative to the mass of the acrylonitrile-based copolymer; and
   said fiber has a BET specific surface area of 50 to 500 m²/g, a SAG value of 2 to 20, and a strontium adsorption rate of 85% or more;
   wherein the SAG value represents an amount of acidic terminal groups in said copolymer and is determined by a measurement method comprising:
   X g of the metal adsorption acrylic fiber is dissolved in 50 ml of dimethylformamide, and passed through an ion exchange resin to give a free acid after which neutralization titration is performed with A ml of a 0.01 N potassium hydroxide/methanol solution until pH 7 is reached;
   separately, 50 ml of dimethylformamide which does not contain the metal adsorption acrylic fiber is taken as a blank and passed through the ion exchange resin after which neutralization titration is performed with B ml of a 0.01 N potassium hydroxide/methanol solution until pH 7 is reached; and
   the SAG value is calculated using the following equation:

$$\text{SAG value (equivalent } g/g) = (A-B)/X \times f \times 10^{-5}$$

where $f$ = a titer of the 0.01 N potassium hydroxide/methanol solution;
   and wherein the strontium adsorption rate is measured by a measurement method comprising:
   adding 5 g of the metal adsorption acrylic fiber, which has been vacuum dried, to a 1000 mL capacity fluorine resin container, then adding 500 mL of an immersion liquid at 20° C. to the container to start immersion of the metal adsorption acrylic fiber, wherein the immersion liquid comprises an aqueous solution of strontium carbonate with a concentration of 0.1 ppm;
   agitating the container for 24 hours after the start of immersion, while maintaining a temperature of the immersion liquid at 20° C., and then collecting the immersion liquid as a test liquid;

introducing the test liquid into an inductively-coupled plasma mass spectrometer, and quantitatively measuring a concentration of strontium $C_1$ (ppm) in the test liquid; and adding 500 mL of the immersion liquid at 20° C., without the metal adsorption acrylic fiber, to another container to give a reference liquid, and quantitatively measuring a concentration of strontium $C_2$ (ppm) in the reference liquid;

wherein the strontium adsorption rate of the metal adsorption acrylic fiber is given by:

strontium adsorption rate (%)=$\{(C_2-C_1)/C_2\}\times 100$.

2. The metal adsorption acrylic fiber according to claim 1, wherein said fiber has a cesium adsorption rate that is 70% or more, wherein the cesium adsorption rate is measured by a measurement method comprising:

adding 5 g of the metal adsorption acrylic fiber, which has been vacuum dried, to a 1000 mL capacity fluorine resin container, then adding 500 mL of an immersion liquid at 20° C. to the container to start immersion of the metal adsorption acrylic fiber, wherein the immersion liquid comprises an aqueous solution of cesium chloride with a concentration of 0.1 ppm;

agitating the container for 24 hours after the start of immersion, while maintaining a temperature of the immersion liquid at 20° C., and then collecting the immersion liquid as a test liquid;

introducing the test liquid into an inductively-coupled plasma mass spectrometer, and quantitatively measuring a concentration of cesium $C_3$ (ppm) in the test liquid; and adding 500 mL of the immersion liquid at 20° C., without the metal adsorption acrylic fiber, to another container to give a reference liquid, and quantitatively measuring a concentration of cesium $C_4$ (ppm) in the reference liquid;

wherein the cesium adsorption rate of the metal adsorption acrylic fiber is given by:

cesium adsorption rate (%)=$\{(C_4-C_3)/C_4\}\times 100$.

3. The metal adsorption acrylic fiber according to claim 1, wherein said fiber has a cerium adsorption rate that is 85% or more, wherein the cerium adsorption rate is measured by a measurement method comprising:

adding 5 g of the metal adsorption acrylic fiber, which has been vacuum dried, to a 1000 mL capacity fluorine resin container, then adding 500 mL of an immersion liquid at 20° C. to the container to start immersion of the metal adsorption acrylic fiber, wherein the immersion liquid comprises an aqueous solution of cerium chloride (III) heptahydrate with a concentration of 0.1 ppm;

agitating the container for 24 hours after the start of immersion, while maintaining a temperature of the immersion liquid at 20° C., and then collecting the immersion liquid as a test liquid;

introducing the test liquid into an inductively-coupled plasma mass spectrometer, and quantitatively measuring a concentration of cerium $C_5$ (ppm) in the test liquid; and adding 500 mL of the immersion liquid at 20° C., without the metal adsorption acrylic fiber, to another container to give a reference liquid, and quantitatively measuring a concentration of cerium $C_6$ (ppm) in the reference liquid;

wherein the cerium adsorption rate of the metal adsorption acrylic fiber is given by:

cerium adsorption rate (%)=$\{(C_6-C_5)/C_6\}\times 100$.

4. The metal adsorption acrylic fiber according to claim 1, wherein the fiber has a second strontium adsorption rate that is 70% or more, wherein the second strontium adsorption rate is measured by a measurement method comprising:

adding 5 g of the metal adsorption acrylic fiber, which has been vacuum dried, to a 1000 mL capacity fluorine resin container, then adding 500 mL of an immersion liquid at 20° C. to the container to start immersion of the metal adsorption acrylic fiber, wherein the immersion liquid comprises an aqueous solution of strontium carbonate with a concentration of 1.0 ppm;

agitating the container for 24 hours after the start of immersion, while maintaining a temperature of the immersion liquid at 20° C., and then collecting the immersion liquid as a test liquid;

introducing the test liquid into an inductively-coupled plasma mass spectrometer, and quantitatively measuring a concentration of strontium $C_7$ (ppm) in the test liquid; and adding 500 mL of the immersion liquid at 20° C., without the metal adsorption acrylic fiber, to another container to give a reference liquid, and quantitatively measuring a concentration of strontium $C_8$ (ppm) in the reference liquid;

wherein the second strontium adsorption rate of the metal adsorption acrylic fiber is given by:

second strontium adsorption rate (%)=$\{(C_8-C_7)/C_8\}\times 100$.

5. The metal adsorption acrylic fiber according to claim 1, wherein said fiber has a second cesium adsorption rate that is 70% or more, wherein the second cesium adsorption rate is measured by a measurement method comprising:

adding 5 g of the metal adsorption acrylic fiber, which has been vacuum dried, to a 1000 mL capacity fluorine resin container, then adding 500 mL of an immersion liquid at 20°C. to the container to start immersion of the metal adsorption acrylic fiber, wherein the immersion liquid comprises an aqueous solution of cesium chloride with a concentration of 1.0 ppm;

agitating the container for 24 hours after the start of immersion, while maintaining a temperature of the immersion liquid at 20° C., and then collecting the immersion liquid as a test liquid;

introducing the test liquid into an inductively-coupled plasma mass spectrometer, and quantitatively measuring a concentration of cesium $C_9$ (ppm) in the test liquid; and adding 500 mL of the immersion liquid at 20° C., without the metal adsorption acrylic fiber, to another container to give a reference liquid, and quantitatively measuring a concentration of cesium $C_{10}$ (ppm) in the reference liquid;

wherein the second cesium adsorption rate of the metal adsorption acrylic fiber is given by:

second cesium adsorption rate (%)=$\{(C_{10}-C_9)/C_{10}\}\times 100$.

6. The metal adsorption acrylic fiber according to claim 1, wherein the BET specific surface area is 100 to 160 m$^2$/g.

7. The metal adsorption acrylic fiber according to claim 6, wherein the SAG value is 2.5 to 16.

8. The metal adsorption acrylic fiber according to claim 1, wherein the BET specific surface area is 80 to 200 m$^2$/g.

9. The metal adsorption acrylic fiber according to claim 1, which is obtained by wet-spinning a spinning dope obtained by dissolving the acrylonitrile-based copolymer in a solvent into a solidifying liquid, and performing stretching and washing without dry densification treatment.

10. A sheet-like product comprising the metal adsorption acrylic fiber according to claim 1.

11. A non-woven fabric comprising the metal adsorption acrylic fiber according to claim 1.

12. The non-woven fabric according to claim 11, having a weight per area of 50 to 1000 g/m$^2$ and a density of 0.05 to 0.5 g/cm$^3$.

13. A metal adsorbent comprising the metal adsorption acrylic fiber according to claim 1.

14. A metal adsorbent comprising the sheet-like product according to claim 10.

15. A metal adsorbent comprising the non-woven fabric according to claim 11.

16. The metal adsorption acrylic fiber according to claim 1, wherein the acrylonitrile-based copolymer consists of at least 85 mass % of a component unit derived from acrylonitrile and component units derived from vinyl acetate and sodium methallylsulfonate.

17. The metal adsorption acrylic fiber according to claim 1, wherein the acrylonitrile-based copolymer consists of at least 87 mass % of a component unit derived from acrylonitrile and component units derived from vinyl acetate and sodium methallylsulfonate.

18. The metal adsorption acrylic fiber according to claim 1, wherein said fiber has a BET specific surface area of 80 to 200 m$^2$/g, a SAG value of 2.5 to 16, and a strontium adsorption rate of 90-100%.

* * * * *